United States Patent [19]

Goodwin

[11] 4,290,201
[45] Sep. 22, 1981

[54] FIELD DRESSING DEVICE

[76] Inventor: Joseph Goodwin, R.D. #4, Box 430-C, Jackson, N.J. 08527

[21] Appl. No.: 74,732

[22] Filed: Sep. 12, 1979

[51] Int. Cl.³ .............................................. A22B 5/16
[52] U.S. Cl. ........................................ 30/294; 17/1 R
[58] Field of Search .................... 17/1 R; 30/294, 286

[56] References Cited

U.S. PATENT DOCUMENTS

| 933,626 | 9/1909 | Coomber | 30/286 |
|---|---|---|---|
| 1,299,084 | 4/1919 | Wilson | 30/286 |
| 2,437,896 | 3/1948 | Rutledge | 30/294 X |
| 2,730,800 | 1/1956 | Bailey | 30/286 X |
| 3,363,315 | 1/1968 | Anderson | 30/286 X |
| 4,157,617 | 1/1979 | Frith | 30/294 |
| 4,198,751 | 4/1980 | Egbert | 30/294 X |

Primary Examiner—Willie G. Abercrombie
Attorney, Agent, or Firm—Charles I. Brodsky

[57] ABSTRACT

The field dressing device of the invention is made to accept the tip of a knife blade, whose cutting surface faces in the same general direction as the tip of the field dressing device. The top portion of the tip of the field dressing device pushes the hide of the animal upwards, while the bottom portion of the tip of the field dressing device pushes the entrails downwards. The configuration of the field dressing device, together with its configured acceptance of the knife blade, permits the user's hand to be kept outside the animal while opening its stomach to remove the entrails.

6 Claims, 3 Drawing Figures

FIELD DRESSING DEVICE

FIELD OF THE INVENTION

This invention relates to field dressing devices, in general, and to such devices as may be used by a hunter for field dressing a big game animal in the fields, woods, etc., quickly, easily and safely, without cutting the entrails and contaminating the meat.

BACKGROUND OF THE INVENTION

As is well known and understood, hunting is one of the most prolific leisure time activities in many countries. Recent reports, for example, indicate that over three million deer are killed annually in the United States, on top of which untold thousands of elk and moose are also killed each year. Such numbers are oftentimes exceeded in other countries, such as Canada, as well. What with the high cost of meat during the present inflationary period, it will well be realized how more and more each day, the meat on such animals become increasingly valuable. Venison on a deer, for example, is well worth between two hundred and three hundred dollars depending upon size. However, as will be appreciated, if it is desired to obtain such meat and to bring it home without it having a gammy taste, it becomes necessary to gut the animal as quickly as possible, preferably, soon after the kill. One problem with doing this, as shown by experience, is that it is important not to cut the entrails or intestines of the animal while so field dressing it, otherwise the waste products will spoil the meat. Additionally to making a mess of it, problems arise in field dressing the animal in such way that complete vision of what the hunter is doing is needed in order to prevent the meat from being contaminated by whatever foreign substance exists on the hunter's hands, from working in the woods.

SUMMARY OF THE INVENTION

As will become clear hereinafter, one feature of the present invention is that the described field dressing device can be used with just about every kind of hunting, or other knife, available. That is, no special knives are needed to employ the feature of the field dressing device of the invention. As will be noted, the field dressing device essentially comprises three portions. The first, located at the top of the tip of the device, serves to lift the skin away as the knife is pushed forward, from front to back of the animal, in gutting it. A second portion lies at the bottom of the tip of the device, and serves to push the intestines downward, and away from the knife, during the cutting action. The third portion of the field dressing device serves to accept the tip of the knife blade, configured to fit within this portion in a manner such that the blade of the knife faces upwardly during the cutting action, in the same general direction as the tip of the field dressing device. As will be seen, this permits the knife to be held continually on the outside of the animal to be gutted, to prevent the hand from being jammed up inside the animal and to prevent any contaminants from the hand from reaching the meat of the animal killed.

BRIEF DESCRIPTION OF THE DRAWING

These and other features of the present invention will be more clearly understood from a consideration of the following description, taken in connection with the accompanying drawing in which.

DETAILED DESCRIPTION OF THE DRAWING

Figure 1:
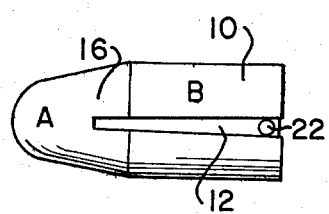
FIG. 1 shows a top view of the field dressing device constructed in accordance with the present invention.
Figure 2:
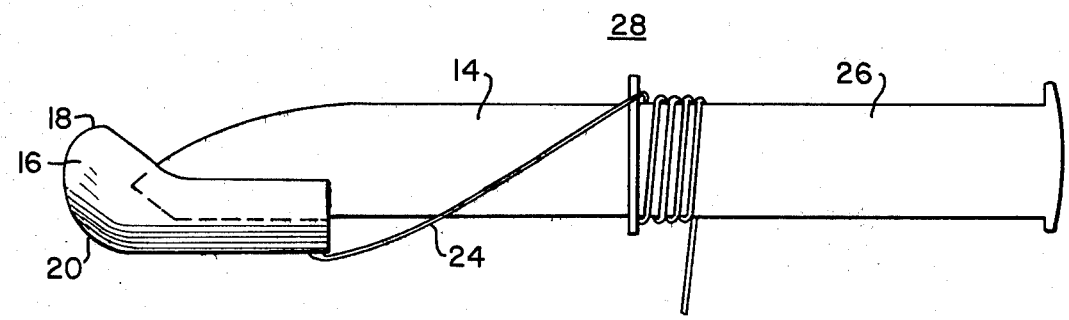
FIGS. 2 and 3 show alternative ways of mounting the device on a knife in conjunction with which it is used.
Figure 3:
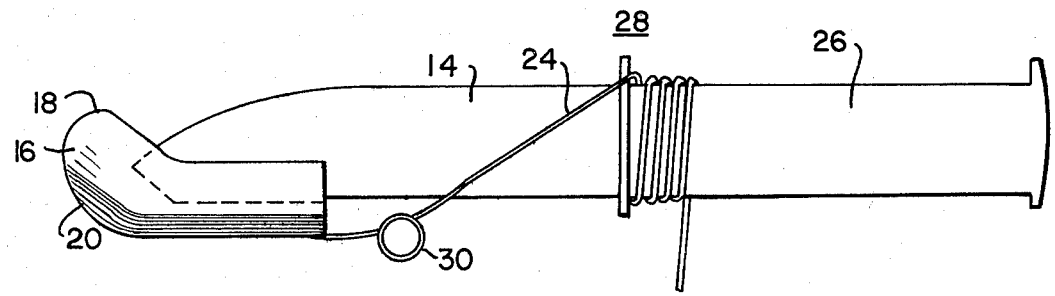

As will be seen in FIGS. 1-3, the field dressing device 10 first of all, incorporates an elongated slot 12 for receiving the non-cutting surface of an available knife blade 14 and its tip—with, in a preferred embodiment, the slot being of a progressively narrowing cross section from end to end. As best shown in FIGS. 2 and 3, the field dressing device 10 incorporates a front or nose portion 16 having an upwardly extending part 18 and a downwardly extending part 20. Also shown is an aperture 22 extending through the body portion of the field dressing device 10 through which a string 24, or similar such device extends to wrap around the handle 26 of a knife 28 for holding the field dressing device 10 in place (FIG. 2). Alternatively, the string 24 can be provided with a ring 30 or similar such device arrangement for grasping by the finger of the user to be held tautly in place thereby, in addition to the method of wrapping around the handle 26, (FIG. 3). When desired for use, the knife is inserted as shown in FIGS. 2 and 3, with the dimensions of the slot 12 and the string 24, with or without the ring 30, being used to hold the knife and field dressing device substantially together.

With the arrangement as shown in FIGS. 2 and 3, the first step in field dressing the animal is to make an incision sufficiently large to insert the front portion of the field dressing device 10. To gut the animal, the knife 28 is then pushed forward, thereby cutting the hide from front to back. In so doing, the part 20 of the device 10 serves to push downward the intestines of the freshly killed animal, the intestines of which have a tendency to rise towards the surface after death. At the same time, the part 18 serves to lift the skin away from the entrails as the blade 14 is being pushed forward. In this regard, four important differences are to be noted:

First, as distinct from other known devices for field dressing an animal, the blade of the knife is pointed upwardly, rather than downwardly.

Secondly, the field dressing action proceeds from front to back, with the knife being pushed away from the user, rather than in the past where the cutting is from back to front, the blade movement there being towards the user.

Third, with the type of field dressing device employed, the user's hands can be kept out of the animal, thereby preventing any contaminants on the hand from spoiling the meat on the carcass. At the same time, with the hands being outside the animal to begin with, none of the intestines or other bodily organs will interfere with the movements of the hand, or blade, as was previously the case where the hand and knife were inserted at the back of the animal, and then drawn towards the front, in a direction towards the user.

Fourthly, with the hands outside the animal, the vision of the movement of the knife blade can readily be observed, and any interference with the intestines or organs of the body noted before the cut continues further. In the past, where an incision is made large enough to insert the hand and the knife prior to cutting, the skin of the animal and movement of the hand itself blocked to some degree the vision of the hunter in seeing what was happening. Also, with prior versions, many hunters were noted to cut themselves in the excitement of the moment, resulting in a degree of toxemia or disease by the mixing of their own blood with that of the animal.

In manufacture of the field dressing device of the invention, it will be appreciated that many methods are available to fabricate the device 10, and a wide selection exists for materials to be employed. The field dressing device of the invention has proved exceedingly simple to operate where the field dressing device 10 is made of wood. For a mass production device, on the other hand, plastic molding techniques can be used to fabricate the component parts. In one embodiment, as shown in FIG. 1, for example, the field dressing device 10 can be made of two halves A, B fabricated from a two piece die. Alternatively, it can be manufactured in a one piece arrangement using plastic injection molding, to which provision is made for the aperture 22 in which the string 24 is fitted. As will be obvious, besides keeping the field dressing device 10 fast on the knife blade 14, the string 24 can serve to retrieve the device 10 if it should by chance, fall off within the animal being gutted. Another advantage, as was previously mentioned, is that the field dressing device 10 can be fabricated to accept any kind of knife blade presently available to hunters. Problems existent with other suggested devices, on the other hand, all employ specific knife configurations to work with field dressing devices there described. However, with such prior art suggestions, the differences exist between those and that of the present invention in that the prior devices utilize a knife blade pointing downwardly and a motion which exists with the hand of the user already within the animal—which, as previously set forth, creates problems in usage and contamination free cutting.

While there have been described what are considered to be preferred embodiments of the present invention, it will be readily apparent to those skilled in the art that modifications can be made without departing from the scope of the teachings herein of having a generally elongated device with a front portion 16 and a body portion 10, both of which are slotted to receive the top of a knife blade, and with the front portion having an upwardly extending first part 18 to deflect away from the incision, the hide of an animal as the knife blade is pushed forward along the length of cut desired. At the same time, it will be seen that the front portion is generally rounded from the first part 18 to the second part 20, which is angled downwardly with respect to the slotting 12 by an amount sufficient to deflect away from the incision the intestines and organs of the animal being field dressed. Although the components 24 and 30 serve to secure, in one manner, the field dressing device of the invention to the knife, it will be appreciated that other manners of securement are possible. For at least such reasons, therefore, resort should be had to the claims appended hereto for a true understanding of the scope of the invention.

I claim:

1. A field dressing device for use with a knife incising the hide of an animal, comprising:

a generally elongated member having a rearwardly extending body portion and a forwardly extending nose portion adjacent thereto, with said body portion having a slot to receive at least the leading edge of the non-cutting surface of the blade of a knife to be held in place thereby and the tip thereof, and with said nose portion having a generally rounded contour extending forwardly of the tip of said knife blade, including a top surface extending upwardly beyond said knife blade tip and a bottom surface extending downwardly beneath said tip; and wherein the top surface of said nose portion extends upwardly with respect to said knife blade tip by an amount sufficient to deflect away from the incision the hide of an animal as said knife blade is pushed forward along the length of cut desired.

2. The field dressing device of claim 1 wherein the slotting of said body portion is of progressively narrowing cross section extending from an edge thereof towards the nose portion adjacent thereto.

3. The field dressing device of claim 2 wherein said nose portion proximate the body portion adjacent thereto is also slotted to receive the non-cutting surface of said knife blade, and includes a recess for receiving the tip of the knife blade held in place thereby.

4. The field dressing device of claim 1 wherein there is also included retention means extending from the slotting of said body portion to secure to said knife for holding said field dressing device in place when in use.

5. The field dressing device of claim 4 wherein said retention means includes pressure transfer means for grasping by the user thereof to increase the securement of said field dressing device to said knife when in use.

6. The field dressing device of claim 1 wherein the bottom surface of said nose portion extends downwardly with respect to said knife blade tip by an amount sufficient to deflect away from the incision the intestines and organs of an animal as said knife blade is pushed forward along the length of cut desired.

* * * * *